(12) United States Patent
Yang et al.

(10) Patent No.: US 8,331,114 B2
(45) Date of Patent: *Dec. 11, 2012

(54) FLYBACK POWER CONVERTERS HAVING A HIGH SIDE DRIVING CIRCUIT

(75) Inventors: Ta-Yung Yang, Milpitas, CA (US);
Shih-Jen Yang, Taipei County (TW);
Ming-Hsuan Lee, Taipei County (TW);
Jian Chang, Taipei County (TW)

(73) Assignee: System General Corporation, Sindian, Taipei County (TW)

( * ) Notice: Subject to any disclaimer, the term of this patent is extended or adjusted under 35 U.S.C. 154(b) by 341 days.

This patent is subject to a terminal disclaimer.

(21) Appl. No.: 12/620,678

(22) Filed: Nov. 18, 2009

(65) Prior Publication Data
US 2010/0202163 A1  Aug. 12, 2010

Related U.S. Application Data

(60) Provisional application No. 61/207,333, filed on Feb. 10, 2009.

(51) Int. Cl.
*H02M 3/337* (2006.01)
(52) U.S. Cl. ............ 363/25; 363/21.12; 363/21.16; 363/132
(58) Field of Classification Search ............ 363/16, 363/17, 21.04, 21.08, 21.12, 21.16, 25, 98, 363/132; 327/423
See application file for complete search history.

(56) References Cited

U.S. PATENT DOCUMENTS

| 6,147,887 | A  | * | 11/2000 | Miettinen | 363/98 |
|---|---|---|---|---|---|
| 6,700,804 | B1 | * | 3/2004 | Reichard | 363/51 |
| 6,952,354 | B1 | * | 10/2005 | Yang et al. | 363/16 |
| 2002/0012253 | A1 | * | 1/2002 | Itoh et al. | 363/16 |
| 2003/0206422 | A1 | * | 11/2003 | Gucyski | 363/34 |
| 2004/0174722 | A1 | * | 9/2004 | Kunii | 363/21.12 |
| 2007/0001742 | A1 | * | 1/2007 | Ishikawa et al. | 327/423 |
| 2007/0070653 | A1 | * | 3/2007 | Sutardja | 363/16 |
| 2009/0251925 | A1 | * | 10/2009 | Usui et al. | 363/16 |
| 2010/0232182 | A1 | * | 9/2010 | Yang et al. | 363/20 |

FOREIGN PATENT DOCUMENTS
WO  WO 2006061924 A1 *  6/2006

* cited by examiner

*Primary Examiner* — Adolf Berhane
*Assistant Examiner* — Fred E Finch, III
(74) *Attorney, Agent, or Firm* — McClure, Qualey & Rodack, LLP

(57) ABSTRACT

A dual-switch flyback power converter includes a control circuit to generate a switching signal. A high-side driving circuit includes a pulse generation circuit. The pulse generation circuit generates a pulse-on signal and a pulse-off signal to control two transistors in response to the switching signal. The two transistors further respectively provide a level-shift-on signal and a level-shift-off signal to a comparison circuit to enable/disable a high-side driving signal. Without using a charge pump circuit to power the high-side driving circuit, a floating winding of a transformer is utilized to provide a floating voltage to power the high-side driving circuit, which reduces the cost of the dual-switch flyback power converter and ensures a sufficient high-side driving capability of the high-side driving circuit.

15 Claims, 3 Drawing Sheets

US 8,331,114 B2

FLYBACK POWER CONVERTERS HAVING A HIGH SIDE DRIVING CIRCUIT

CROSS REFERENCE TO RELATED APPLICATIONS

The present application claims the benefit of U.S. provisional application entitled "Dual-Switches Flyback Power Converter with a High-Side Driver and Floating Supply", Ser. No. 61/207,333, filed Feb. 10, 2009.

BACKGROUND OF THE INVENTION

1. Field of the Invention

The present invention relates generally to power converters, and more particularly, to flyback power converters.

2. Description of the Related Art

A dual-switch flyback power converter is a highly efficient power converter since the leakage inductance's energy of its transformer can be retrieved to its input power rail. A patent titled "Highly Efficient Switching Power Converter Using a Charge Pump to Power the Driving Circuit" by Yang, U.S. Pat. No. 7,460,380 has been disclosed recently. In this prior art, a charge pump circuit composed of a diode 80 and a capacitor 85 is activated by a transistor 31. The charge pump circuit is utilized to power a high-side driving circuit 90. Despite the switching signal $S_1$ driving the high-side transistor 11 via the high-side driving circuit 90 and driving the low-side transistor 21 via the low-side driving circuit 95, another switching signal $S_2$ is required to control the transistor 31 to activate the charge pump circuit. However, the duty cycle of the switching signal $S_2$ is limited by the feedback signal $V_{FB}$ from the secondary circuit 60. Once the duty cycle of the transistor 31 is not near 100%, the capacitor 85 may be unable to be charged to maintain a sufficient voltage level to power the high-side driving circuit 90.

BRIEF SUMMARY OF THE INVENTION

A dual-switch flyback power converter comprises a first transformer, a second transformer, a high-side transistor, a low-side transistor, two diodes, a first control circuit, a second control circuit, a high-side driving circuit, and a low-side driving circuit.

The first transformer is switched by the high-side transistor and the low-side transistor. The two diodes are coupled to the first transformer to circulate energy of a leakage inductance of the first transformer to an input power rail of the flyback power converter. The first control circuit generates a first switching signal to control the high-side transistor and the low-side transistor. The high-side driving circuit is coupled to receive the first switching signal for driving the high-side transistor. The low-side driving circuit is coupled to receive the first switching signal for driving the low-side transistor. A second switching signal generated by the second control circuit is utilized to switch the second transformer for generating an auxiliary voltage to power the first control circuit, the second control circuit, the high-side driving circuit, and the low-side driving circuit. The second switching signal is further utilized to switch the second transformer for generating a floating voltage to power the high-side driving circuit. Furthermore, the floating voltage can also be obtained from an added floating winding of the first transformer.

It is an objective of the present invention to overcome the problem of limited maximum duty cycle in the prior art.

It is another objective of the present invention to ensure a sufficient high-side driving capability of the high-side driving circuit.

It is also another objective of the present invention to reduce the cost of the dual-switch flyback power converter when an auxiliary power supply is available in the system.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
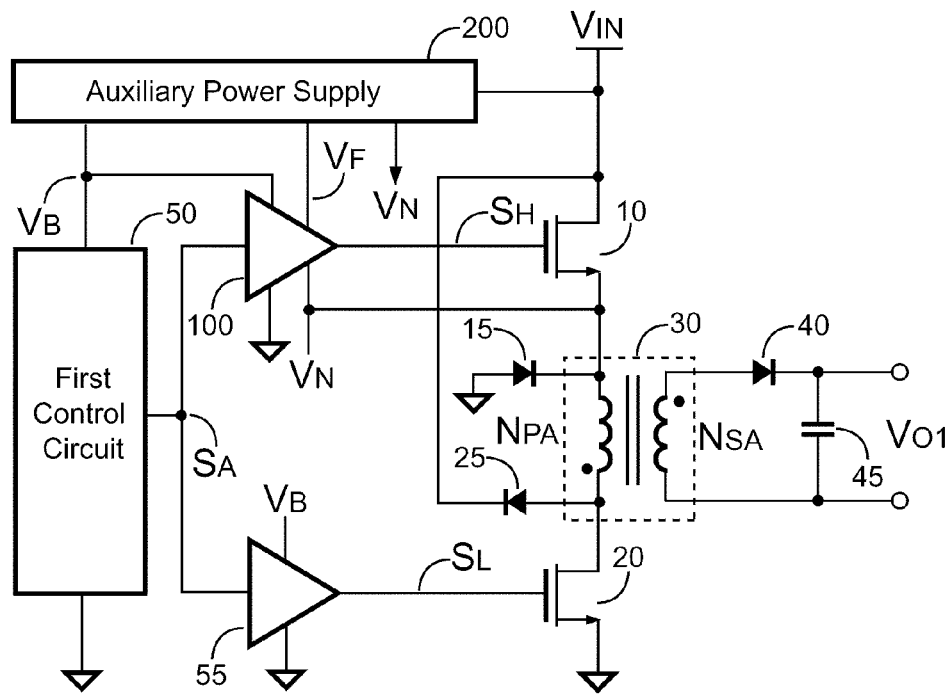
FIG. 1 shows an embodiment of a dual-switch flyback power converter according to the present invention.

FIG. 1 shows an embodiment of a dual-switch flyback power converter according to the present invention. The flyback power converter comprises an auxiliary power supply 200, a high-side driving circuit 100, a low-side driving circuit 55, a high-side transistor 10, a low-side transistor 20, a first transformer 30, a first control circuit 50, diodes 15, 25, 40, and a capacitor 45. The first transformer 30 includes a primary winding $N_{PA}$ and a secondary winding $N_{SA}$ for energy transfer. The high-side transistor 10 is connected between an input power rail $V_{IN}$ and a first terminal of the primary winding $N_{PA}$. The low-side transistor 20 is connected from a second terminal of the primary winding $N_{PA}$ and a ground reference. The high-side transistor 10 and the low-side transistor 20 are coupled to switch the first transformer 30. An anode of the diode 15 is connected to the ground reference. A cathode of the diode 15 is connected to the first terminal of the primary winding $N_{PA}$. An anode of the diode 25 is connected to the second terminal of the primary winding $N_{PA}$. A cathode of the diode 25 is connected to the input power rail $V_{IN}$ of the flyback power converter. The diodes 15 and 25 are used to circulate energy of the leakage inductance of the first transformer 30 to the input power rail $V_{IN}$ when the transistors 10 and 20 are turned off. The diode 40 is connected in series with the capacitor 45 between a first terminal and a second terminal of the secondary winding $N_{SA}$. A first output voltage $V_{O1}$ is obtained across the capacitor 45. The first control circuit 50 generates a first switching signal $S_A$. The high-side driving circuit 100 receives the first switching signal $S_A$ to generate a high-side driving signal $S_H$ for driving the high-side transistor 10. The low-side driving circuit 55 receives the first switching signal $S_A$ to generate a low-side driving signal $S_L$ for driving the low-side transistor 20. The high-side transistors 10 and the low-side transistor 20 are simultaneously turned on/off in response to the first switching signal $S_A$. The high-side driving circuit 100 is powered by an auxiliary voltage $V_B$. It is further powered by a floating voltage $V_F$ and a floating ground reference $V_N$. The low-side driving circuit 55 is powered by the auxiliary voltage $V_B$. The first terminal of the primary winding $N_{PA}$ is connected to the floating ground reference $V_N$.

Figure 2:
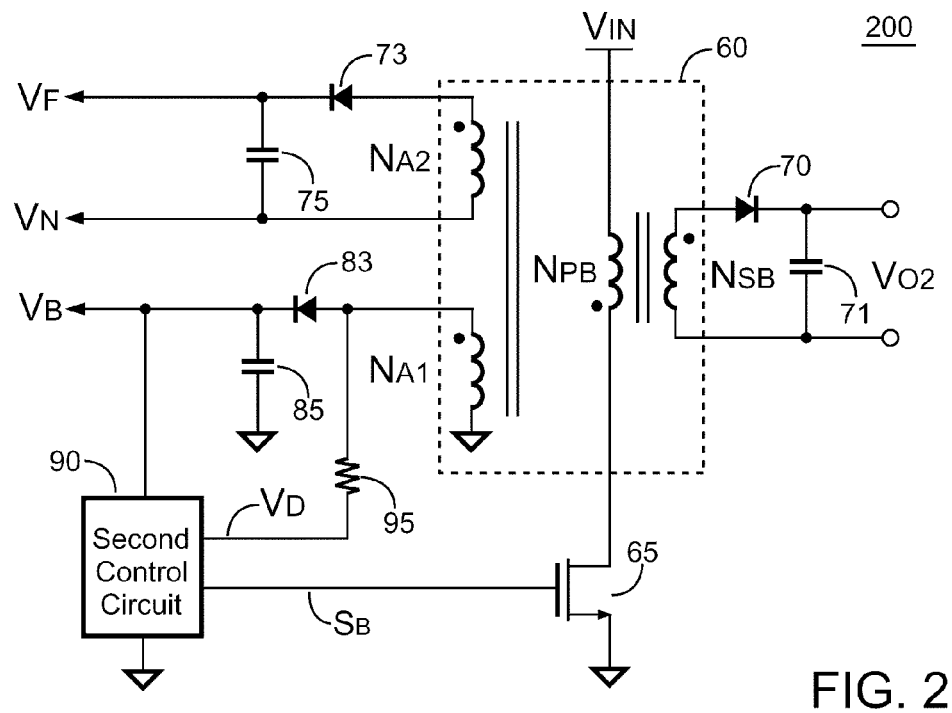
FIG. 2 shows an embodiment of an auxiliary power supply of the dual-switch flyback power converter.

FIG. 2 shows an embodiment of the auxiliary power supply 200 of the dual-switch flyback power converter according to the present invention. The auxiliary power supply 200 comprises a second transformer 60, a transistor 65, and a second control circuit 90. The second transformer 60 includes a primary winding $N_{PB}$, a secondary winding $N_{SB}$, an auxiliary winding $N_{A1}$, and a floating winding $N_{A2}$. A diode 70 is connected in series with a capacitor 71 between a first terminal and a second terminal of the secondary winding $N_{SB}$. A second output voltage $V_{O2}$ is obtained across the capacitor 71. A resistor 95 is connected to a first terminal of the auxiliary winding $N_{A1}$ to detect the second output voltage $V_{O2}$ for providing a feedback signal $V_D$ to the second control circuit 90. The second control circuit 90 receives the feedback signal $V_D$ to generate a second switching signal $S_B$. The second switching signal $S_B$ controls the transistor 65 to switch the second transformer 60 to regulate the second output voltage $V_{O2}$. A diode 83 is connected in series with a capacitor 85 between the first terminal of the auxiliary winding $N_{A1}$ and the ground reference. The auxiliary voltage $V_B$ is obtained across the capacitor 85. A diode 73 is connected in series with a capacitor 75 between a first terminal and a second terminal of the floating winding $N_{A2}$. The second terminal of the floating winding $N_{A2}$ is connected to the floating ground reference $V_N$. The floating voltage $V_F$ is obtained at the joint of the diode 73 and the capacitor 75. The auxiliary voltage $V_B$ and the floating voltage $V_F$ are correlated to the second output voltage $V_{O2}$, which can be shown as following equations:

$$V_B = \frac{T_{NA1}}{T_{NSB}} \times V_{O2} \quad (1)$$

$$V_F = \frac{T_{NA2}}{T_{NSB}} \times V_{O2} + V_N \quad (2)$$

where $T_{NA1}$, $T_{NA2}$, and $T_{NSB}$ respectively represent winding turns of the auxiliary winding $N_{A1}$, the floating winding $N_{A2}$, and the secondary winding $N_{SB}$.

Referring to FIG. 1 and FIG. 2, the auxiliary power supply 200 provides the auxiliary voltage $V_B$ for the first control circuit 50, the second control circuit 90, the high-side driving circuit 100, and the low-side driving circuit 55. The auxiliary power supply 200 further provides the floating voltage $V_F$ and the floating ground reference $V_N$ for the high-side driving circuit 100.

Figure 3:
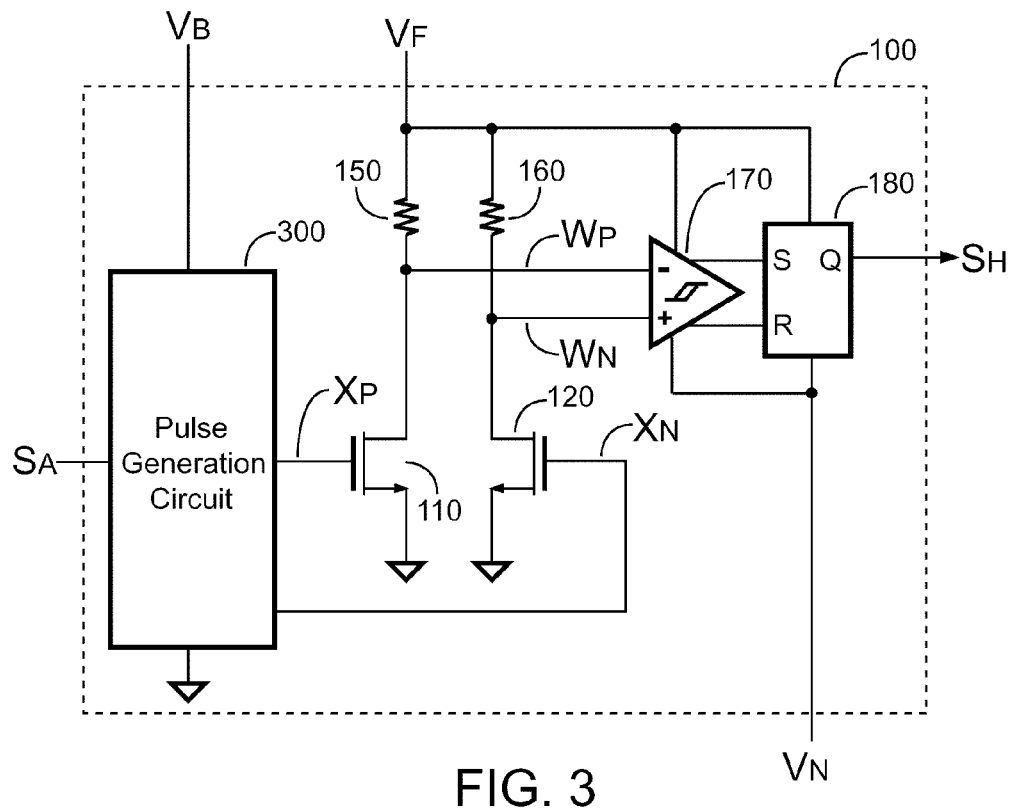
FIG. 3 shows an embodiment of a high-side driving circuit of the dual-switch flyback power converter.

FIG. 3 shows an embodiment of the high-side driving circuit 100 of the dual-switch flyback power converter according to the present invention. It is a differential-mode level-shift circuit. The high-side driving circuit 100 comprises a pulse generation circuit 300, transistors 110, 120, resistors 150, 160, a comparison circuit 170 with hysteresis, and a flip-flop 180. A pulse generation circuit 300 generates a pulse-on signal $X_P$ and a pulse-off signal $X_N$ in response to the first switching signal $S_A$. The pulse generation circuit 300 generates the pulse-on signal $X_P$ at the rising edge of the first switching signal $S_A$. The pulse generation circuit 300 generates the pulse-off signal $X_N$ at the falling edge of the first switching signal $S_A$. The operation of the pulse generation circuit 300 to generate pulse-on signal $X_P$ and pulse-off signal $X_N$ in response to the rising edge and the falling edge of the first switching signal $S_A$ is well known to those skilled in the art, it is therefore omitted herein.

A gate of the transistor 110 and a gate of the transistor 120 are respectively controlled by the pulse-on signal $X_P$ and the pulse-off signal $X_N$. The sources of the transistors 110 and 120 are connected to the ground reference. A first terminal of the resistor 150 and a first terminal of the resistor 160 are supplied with the floating voltage $V_F$. A second terminal of the resistor 150 is connected to a drain of the transistor 110. A second terminal of the resistor 160 is connected to a drain of the transistor 120. The drain of the transistor 110 is connected to a negative terminal of the comparison circuit 170. The drain of the transistor 120 is connected to a positive terminal of the comparison circuit 170. The pulse-on signal $X_P$ and the pulse-off signal $X_N$ are utilized to control the transistors 110 and 120 for respectively generating a level-shift-on signal $W_P$ at the negative terminal of the comparison circuit 170 and a level-shift-off signal $W_N$ at the positive terminal of the comparison circuit 170. The comparison circuit 170 receives the level-shift-on signal $W_P$ and the level-shift-off signal $W_N$ for setting and resetting the flip-flop 180. In an embodiment of the present invention, as the voltage level of the level-shift-on signal $W_P$ is lower than that of the level-shift-off signal $W_N$, the flip-flop 180 is set to enable the high-side driving signal $S_H$ at its output accordingly. In the aforementioned embodiment of the present invention, as the voltage level of the level-shift-on signal $W_P$ is higher than that of the level-shift-off signal $W_N$, the flip-flop 180 is reset to disable the high-side driving signal $S_H$ at its output accordingly. The high-side driving signal $S_H$ is used to drive the high-side transistor 10. The comparison circuit 170 and the flip-flop 180 are powered by the floating voltage $V_F$ and the floating ground reference $V_N$.

Figure 4:
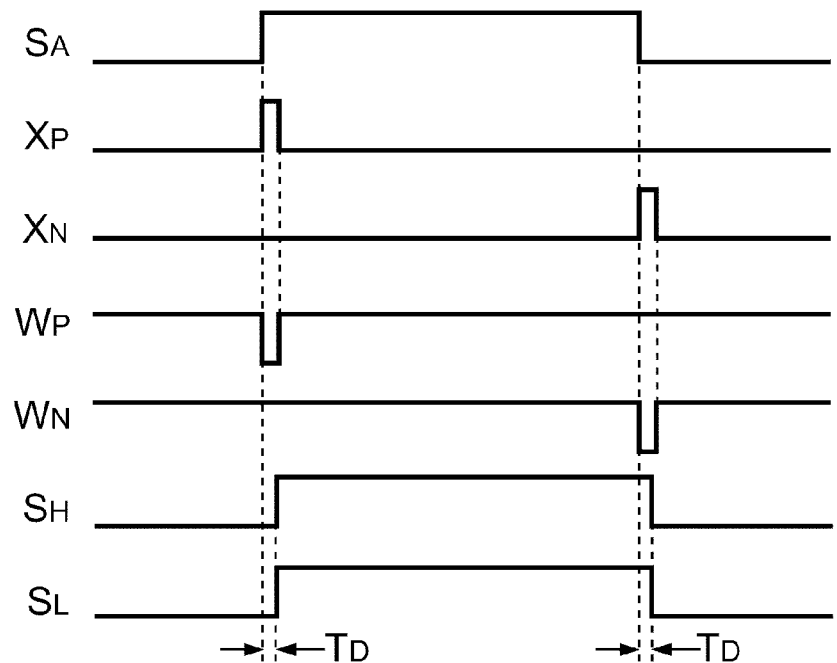
FIG. 4 shows key waveforms of the signals of the present invention.

FIG. 4 shows key waveforms of the signals of the present invention. The pulse-on signal $X_P$ is generated at the rising edge of the first switching signal $S_A$. The pulse-off signal $X_N$ is generated at the falling edge of the first switching signal $S_A$. The phase of the level-shift-on signal $W_P$ is inverted to that of the pulse-on signal $X_P$. The phase of the level-shift-off signal $W_N$ is inverted to that of the pulse-off signal $X_N$. The pulse widths of the pulse-on signal $X_P$ and the pulse-off signal $X_N$ are both shorter than 500 nsec. The high-side driving signal $S_H$ and the low-side driving signal $S_L$ are switched on simultaneously after a delay time $T_D$ in response to the falling edge of the level-shift-on signal $W_P$. The high-side driving signal $S_H$ and the low-side driving signal $S_L$ are switched off simultaneously after the delay time $T_D$ in response to the falling edge of the level-shift-off signal $W_N$. The delay time $T_D$ is determined by the hysteresis level of the comparison circuit 170.

Figure 5:
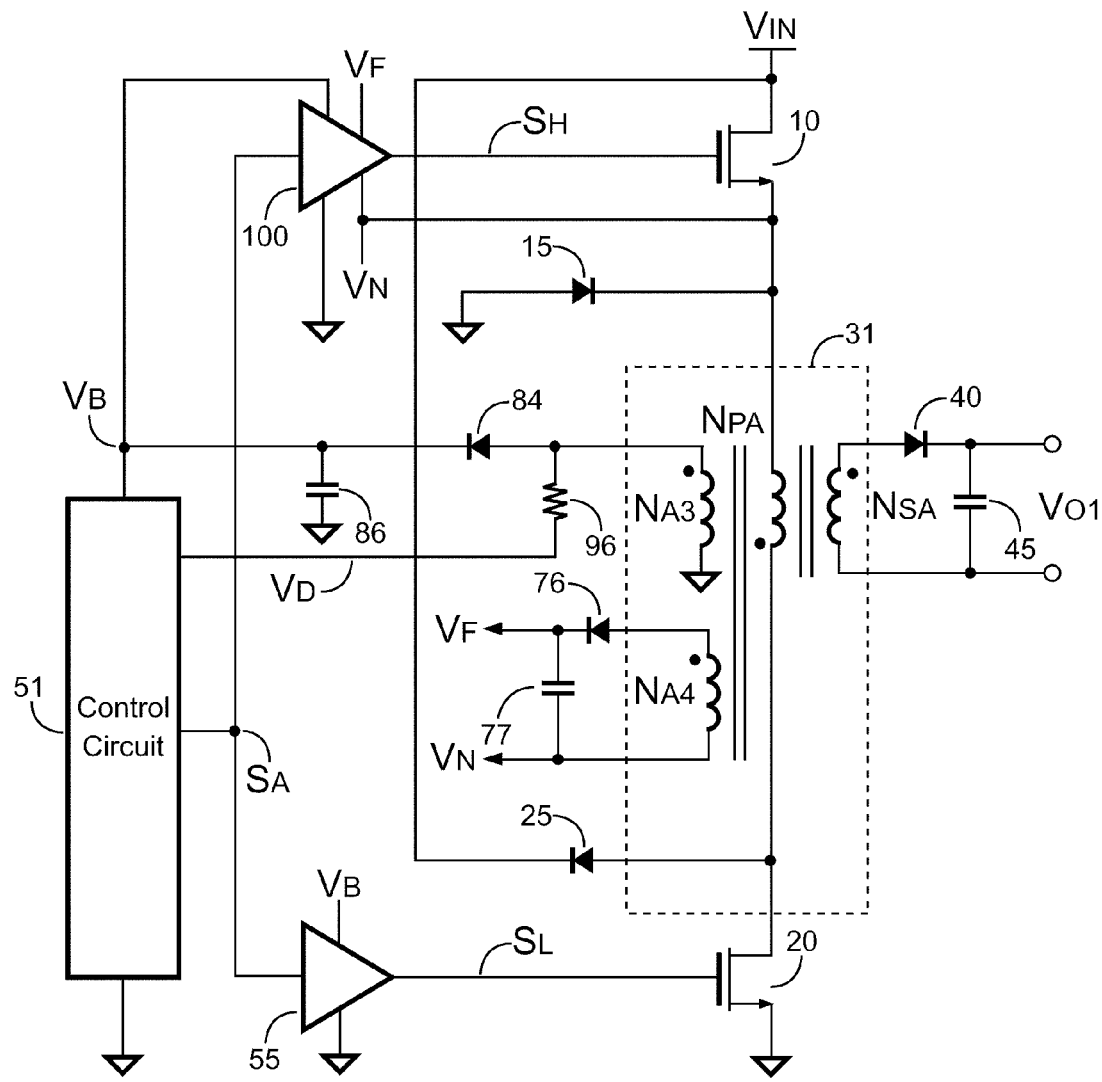
FIG. 5 shows another embodiment of the dual-switch flyback power converter according to the present invention.

FIG. 5 shows another embodiment of the dual-switch flyback power converter according to the present invention. When the auxiliary power supply, such as 200 in FIG. 1, is not available in the system, adding an auxiliary winding $N_{A3}$ and a floating winding $N_{A4}$ to the transformer 30 of FIG. 1 to form a transformer 31 can serve to provide the auxiliary voltage $V_B$, the floating voltage $V_F$, and the floating ground reference $V_N$, which greatly reduces the cost of the dual-switch flyback power converter.

Referring to FIG. 5, a resistor 96 is connected to a first terminal of the auxiliary winding $N_{A3}$ to detect the first output voltage $V_{O1}$ for providing a feedback signal $V_D$ to a control circuit 51. A diode 84 is connected in series with a capacitor 86 between the first terminal of the auxiliary winding $N_{A3}$ and the ground reference. The auxiliary voltage $V_B$ is obtained across the capacitor 86. A diode 76 is connected in series with a capacitor 77 between a first terminal and a second terminal of the floating winding $N_{A4}$. The second terminal of the floating winding $N_{A4}$ is connected to the floating ground reference $V_N$. The floating voltage $V_F$ is obtained at the joint of the diode 76 and the capacitor 77. The control circuit 51 provides the first switching signal $S_A$ to the high-side driving circuit 100 and the low-side driving circuit 55 for respectively driving the high-side transistor 10 and the low-side transistor 20.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flyback power converter, comprising:
   a first transformer, for energy transfer;
   a high-side transistor and a low-side transistor, coupled to switch said first transformer;
   two diodes, coupled to said first transformer to circulate energy of a leakage inductance of said first transformer to an input power rail of said flyback power converter;
   a first control circuit, generating a first switching signal to control said high-side transistor and said low-side transistor;
   a high-side driving circuit, coupled to receive said first switching signal for driving said high-side transistor; and
   a second control circuit and a second transformer, generating a floating voltage to power said high-side driving circuit,
   wherein said second control circuit generates a second switching signal, and said second switching signal switches said second transformer for generating an auxiliary voltage to power said first control circuit, said second control circuit, and said high-side driving circuit.

2. The flyback power converter as claimed in claim 1 further comprising a low-side driving circuit coupled to receive said first switching signal for driving said low-side transistor, and said low-side driving circuit is powered by said auxiliary voltage.

3. The flyback power converter as claimed in claim 1, wherein said high-side transistor and said low-side transistor are turned on/off simultaneously.

4. The flyback power converter as claimed in claim 1, wherein said high-side driving circuit is a differential-mode level-shift circuit.

5. The flyback power converter as claimed in claim 1, wherein said high-side driving circuit comprises:
   a pulse generation circuit, generating a pulse-on signal and a pulse-off signal;
   two transistors, coupled to respectively receive said pulse-on signal and said pulse-off signal for generating a level-shift-on signal and a level-shift-off signal by switching on said two transistors;
   a comparison circuit, receiving said level-shift-on signal and said level-shift-off signal; and
   a flip-flop, set and reset by said comparison circuit to generate a high-side driving signal for driving said high-side transistor;
   wherein said comparison circuit and said flip-flop are powered by said floating voltage and a floating ground reference.

6. The flyback power converter as claimed in claim 5, wherein the pulse widths of said pulse-on signal and said pulse-off signal are both shorter than 500 nsec.

7. The power converter as claimed in claim 5, wherein said pulse-on signal and pulse-off signal are generated in response to said first switching signal.

8. A power converter comprising:
   a transformer, for energy transfer;
   a high-side transistor and a low-side transistor, coupled to switch said transformer;
   two diodes, coupled to said transformer to circulate energy of a leakage inductance of said transformer to an input power rail of said power converter;
   a control circuit, generating a switching signal to control said high-side transistor and said low-side transistor; and
   a high-side driving circuit, coupled to receive said switching signal for driving said high-side transistor;
   wherein said high-side driving circuit is powered by a floating voltage provided from a floating winding of said transformer.

9. The power converter as claimed in claim 8 further comprising a low-side driving circuit coupled to receive said switching signal for driving said low-side transistor.

10. The power converter as claimed in claim 9, wherein an auxiliary winding of said transformer generates an auxiliary voltage to power said control circuit, said high-side driving circuit, and said low-side driving circuit.

11. The power converter as claimed in claim 8, wherein said high-side transistor and said low-side transistor are turned on/off simultaneously.

12. The power converter as claimed in claim 8, wherein said high-side driving circuit is a differential-mode level-shift circuit.

13. The power converter as claimed in claim 8, wherein said high-side driving circuit comprises:
   a pulse generation circuit, generating a pulse-on signal and a pulse-off signal;
   two transistors, coupled to respectively receive said pulse-on signal and said pulse-off signal for generating a level-shift-on signal and a level-shift-off signal by switching on said two transistors;
   a comparison circuit, receiving said level-shift-on signal and said level-shift-off signal; and
   a flip-flop, set and reset by said comparison circuit to generate a high-side driving signal for driving said high-side transistor;
   wherein said comparison circuit and said flip-flop are powered by said floating voltage and a floating ground reference.

14. The power converter as claimed in claim 13, wherein the pulse width of said pulse-on signal and said pulse-off signal are both shorter than 500 nsec.

15. The power converter as claimed in claim 13, wherein said pulse-on signal and the pulse-off signal are generated in response to said switching signal.

* * * * *